June 8, 1965
S. P. DENSMORE
3,187,458
INSECT EXTERMINATOR
Filed Jan. 27, 1964
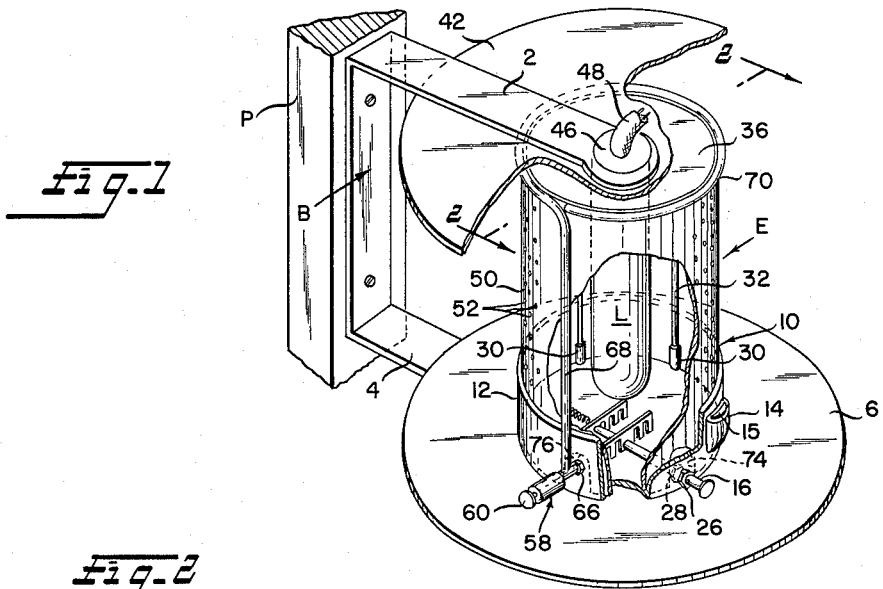
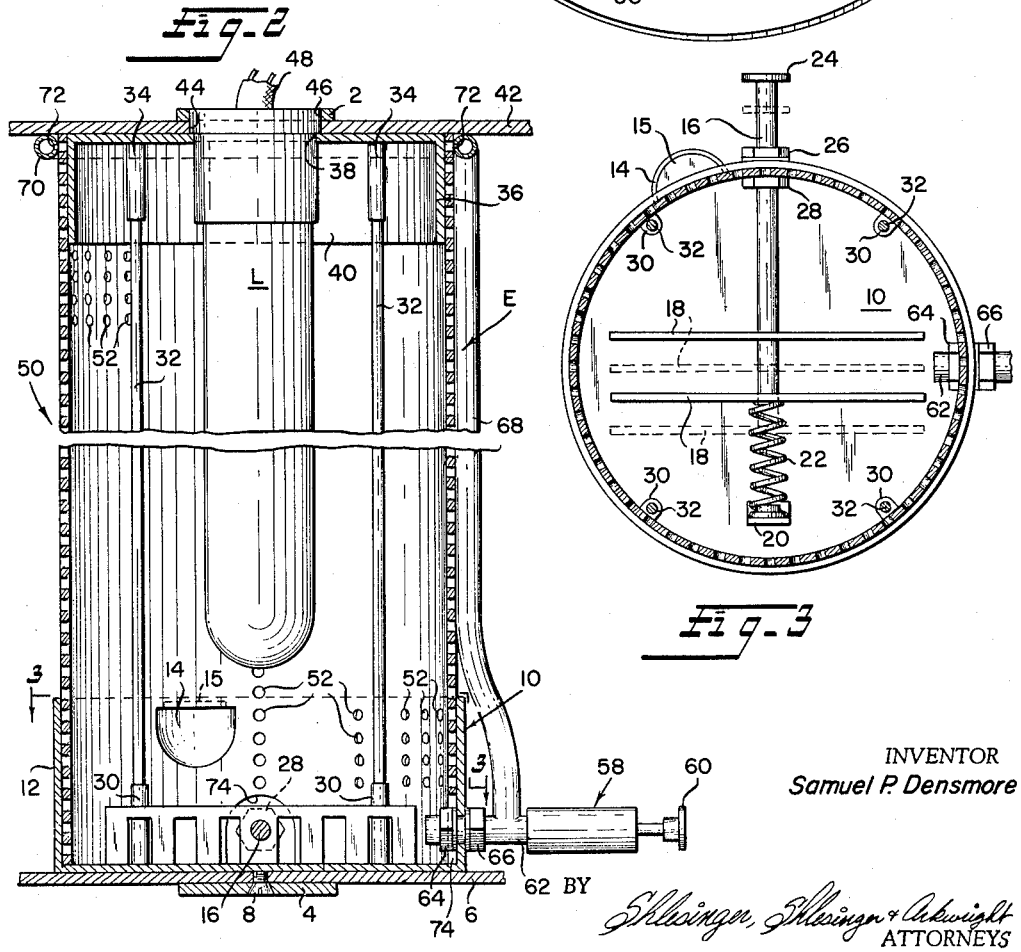
INVENTOR
Samuel P. Densmore
BY Schlesinger, Schlesinger & Arkwright
ATTORNEYS

United States Patent Office 3,187,458
Patented June 8, 1965

3,187,458
INSECT EXTERMINATOR
Samuel P. Densmore, 100 W. Cold Spring Lane,
Baltimore, Md.
Filed Jan. 27, 1964, Ser. No. 340,131
9 Claims. (Cl. 43—113)

This invention pertains to devices for exterminating insects and particularly to night flying insects. It is especially designed for outdoor use and particularly in gardens and back yards, for use on porches and patios, and for general use in any area where people might congregate in the evening.

Night type exterminators generally rely on light attracting means or scented insecticides. A good many of the light attracting exterminators on the market, utilize the electrocution principle. Since electrocution type devices can be dangerous and have resulted in death or serious injury due to malfunctioning, other devices have been developed to use other means for trapping insects than electrocution types. Some types of insect exterminators include traps into which the insects fall once they reach the area of the light. It is common to see on patios poles which support oil lamps for the purposes of exterminating insects by having them fly directly into the flame. These types of flame exterminators are not as effective primarily because of costs of the fuel and the small flame produced by the types on the market. If the flame were made larger, a considerable cost would be involved. In addition, the flame is not constant in areas where there is wind and frequently is ineffective under these conditions.

Wick type exterminators are old in the art and basically have relied on odor to attract the insects. Though they are effective with regard to certain insects, the odor does not attract all types of insects as does a light type exterminator.

It is an object of this invention to provide an exterminator for insects which combines all of the advantages of light type and odor type exterminators and at the same time avoids all of the disadvantages in conjunction therewith.

It is a further object of this invention to provide an insect exterminator which avoids the possible malfunctioning problems of electrocution type devices but does take advantage of an electrical light source.

Another object of this invention is to provide an exterminator which is simple in construction and inexpensive to manufacture.

Still another object of this invention is to provide an exterminator which may be readily assembled and which may be secured to a post, tree or the like with a minimum of effort.

Yet a further object of this invention is to provide an exterminator which is easily kept clean and which may be left outdoors even in inclement weather without fouling the device.

Still another object of this invention is to provide an exterminator which can be readily filled without necessitating removal or disassembly of the device.

Another object of this invention is to provide an exterminator which has means for agitating the fluid chemical insecticide in order to obtain better saturation of the wick.

Still a further object of this invention is to provide an insect exterminator which has means for effectively soaking the wick portion.

These and other objects and advantages of this invention will be apparent from the reading of the following description and claims.

In the drawings:

FIGURE 1 is a perspective view of the invention portions of which are cut away to illustrate the interior construction.

FIGURE 2 is a cross-sectional view of the device taken on lines 2—2 of FIGURE 1 and viewed in the direction of the arrows.

FIGURE 3 is a cross-sectional view of the device taken on the lines 3—3 of FIGURE 2 and viewed in the direction of the arrows.

In FIGURE 1, a post P has affixed thereto a bracket B having extending arms 2 and 4. The arms support an exterminator E.

A base plate 6 is supported by the arm 4 and secured thereto by a screw member 8. Resting on the base plate 6 which can be of metal, wood, or plastic or similar material, and secured thereto by adhesive or other securing means such as bolts, screws, and the like, is a pan or receptacle 10 for receiving fluid insecticides. The pan 10 must have a side wall 12 of sufficient height to hold an adequate supply of insecticide in order to avoid frequent fillings.

Struck from the side wall 12 is a filling spout 14. A plug 15 fits within the filling spout 14 in order to prevent debris from falling into the opening.

A rod 16 projects through the side wall 12 and into the receptacle 10. The rod supports within the receptacle 10, agitator rakes 18. A spring retainer member 20 is secured by welding or the like to the bottom of the pan 10. A spring 22 is secured to the end of the rod 16 and to the retainer 20 and is normally in relaxed position as illustrated in FIGURE 3 in the solid lines. On the outer end of the rod 16 is a button 24. The rod 16 passing through the wall 12 is sealed on either side thereof by sealing washers 26 and 28. The washers may be of resilient rubber-like material which frictionally engage the shaft or rod 16 in order to form a seal to prevent the insecticide from bleeding out from the pan.

*Operation of the agitator rake*

The agitator rake is operated by pushing on the button 24. Upon depression of the button 24, the rake assumes the dotted line position as shown in FIGURE 3. The spring 22 being under compression, will return the rakes 18 on the rod 16 to the original solid line position shown in FIGURE 3 upon release of the button 24. The pan 10 is provided with a series of bosses 30 into which are inserted supporting rods 32 which extend vertically and are received in bosses 34 of a cover member 36. An opening 38 is provided in the cover member 36. The cover member 36 is provided with a wall skirt 40. Secured to the cover member 40 is a cover plate 42. It will be obvious that the cover member 36 and the cover plate 42 could be one integrally molded piece. Similarly it will be obvious that base member 6 and pan 10 could be one solid molded plastic piece or the like. The cover plate 42 is provided with an opening 44 aligned with the opening 38. The openings 38 and 44 receive a lamp L which is housed within the exterminator E. The lamp L is also received within an opening 46 of the leg 2 of the bracket B. An insulated electrical cord 48 is provided which will be plugged into a proper outlet (not shown).

The cover plate 42 and the base plate 6 are shown as being circular though they may be of any other general configuration. The cover plates extend beyond the outer periphery of the pin 10 and the cover 36. The cover plate 42 provides protection to the exterminator E preventing rain from striking directly on the top thereof or on the side walls. The base plate 6 serves as a means for catching the insects which have been killed by contact with the insecticides.

A tubular wick 50 with perforations 52 is maintained in an upright position and is supported at the bottom tween the wall 12 and the bosses 30 and is maintained in its cylindrical configuration as shown in the figures by means of the rods 32. The wick 50 serves as a sleeve over the cover 36.

A pump 58 provided with a plunger 60 is attached to a tubular extension 62 which passes through the wall 12 of the pan 10. Sealing grommets 64 and 66 prevent leakage of the insecticide from the pan 10. The pump 58 pumps fluid insecticide through the tube 62 and up the vertical tube 68 to the circular horizontal tube 70. The horizontal tube 70 is provided with perforations 72 for dispensing insecticide onto the wick 50. The circular or ring like tube 70 is manufactured to conform to a cylinder having a diameter slightly less than the diameter of the cover 30 and thereby serves as a retainer member for holding the sleeve portion of the wick 50 against the skirt 40 of the cover member 36. The dispensing tube 70 being under some compression when fitted onto the wick 50, keeps the wick 50 from slipping down.

The wick 50 may be of fiber glass, asbestos, or other similar porous and wick type absorbing material.

The wick 50 is provided with cut out portions 74 and 76 which permit the wick to be positioned over the rod 16 and the tube 62 without interference therewith.

It will be obvious that the lamp L will be sealed at the openings 46, 44, and 38 by any regular means such as gaskets, or adhesive bonding or the like. It is preferred that some type of removable gasketing be provided for the lamp fixture so that the lamp L may be readily replaced should it burn out.

*Operation*

When the lamp L is lighted, beams of light are transmitted through the perforations 52. The wick 50 is saturated with the insecticide which has been absorbed thereon by the capillary action of the wick within the pan 10 and by the insecticide dispensed thereon from the tube 70 by the pump 58. The insects fly into the wick 50 and come in contact with the insecticide thereon and are immobilized or killed immediately thereafter.

Since the fluid eventually will become viscous and clog the pores of the wick, the pump will still maintain a sufficient saturation in the wick for a long period of time thereby increasing the life of the wick. When the wick has no longer any great absorbant action, it can be readily replaced by another wick by simply disconnecting the exterminator E from the bracket B by removing the screw 8 and the lamp L. Since the wick is maintained on the cap 36 by means of spring pressure of the circular tube 72, the tube is merely sprung outwardly and the wick slipped from the end of the exterminator.

All of the washer members 26, 28, 64 and 66 are removable so that the various parts may be disconnected. The rakes 18 may be frictionally secured to the rod 16 by providing rubber gaskets (not shown) which can be readily removed to allow removal of the rake members 18. The spring 22 is provided for ready removal from the rod 16. A hole in the rod 16 at the end thereof may be provided for insertion of one end of the spring in order to hold it to the rod 16. The spring may thus be slipped from the hole (not shown) to permit the rod 16 to be withdrawn.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

What is claimed is:
1. An insect exterminator comprising:
 (a) a base member including a reservoir for receiving fluid insecticide
 (b) a wick mounted in said reservoir in an upright position and normally saturated by said insecticide
 (c) said wick being perforated and tubular in configuration
 (d) a lamp positioned behind said perforations and within said tube, said lamp when lit enticing insects to fly into said wick so as to cause the insecticide to be picked up by said insects
 (e) said base member including pump means for aiding in saturating said wick,
 (f) said pump means including a vertical tube running to the top of the wick, and
 (g) said vertcal tube including a ring-like perforated tube extending about the top of said wick, so that fluid insecticide can be pumped up to said tube to be dispensed around the upper margin of said wick for aiding in saturating said wick.
2. An insect exterminator is in claim 1 and wherein:
 (a) said base member includes supports for maintaining said wick in an upright position.
3. An insect exterminator as in claim 2 and wherein:
 (a) said exterminator includes a top covering means for said wick to prevent material from falling into said reservoir.
4. An insect exterminator as in claim 3 and wherein:
 (a) said top cover includes means for receiving said supports, and
 (b) said lamp is supported from said top cover.
5. An insect exterminator as in claim 4 and wherein:
 (a) said top cover includes a downwardly projecting flange
 (b) said wick fitted about said flange and secured to said flange by said ring-like perforate tube.
6. An insect exterminator as in claim 5 and wherein:
 (a) said base member includes means for agitating said insecticide to prevent the settling out of impurities
 (b) said pump and agitating means project through a wall of said reservoir
 (c) said pump and agitating means including hand operators outside the wall of said reservoir.
7. An insect exterminator as in claim 5 and wherein:
 (a) said wick is positioned at the bottom between said supports and the inside wall of said reservoir,
 (b) and said wick is provided with cut-outs for fitting over said pump and agitating projecting means.
8. An insect exterminator as in claim 7 and wherein:
 (a) said base member includes means for agitating said insecticide to prevent settling out of impurities
 (b) said agitator is spring biased within said reservoir,
 (c) said agitator including a rod and a pair of parallel rake members extending laterally from said rod.
9. An insect exterminator as in claim 8 and wherein:
 (a) said top cover and said base member include a bracket support member for securing said exterminator to a post and the like.

References Cited by the Examiner

UNITED STATES PATENTS

| 1,186,178 | 6/16 | French | 43—131 |
| 1,254,286 | 1/18 | Staples | 43—131 |
| 1,573,278 | 2/26 | Schlesinger | 43—131 |

FOREIGN PATENTS 369,915 4/39 Italy.
276,947 11/51 Switzerland.

ABRAHAM G. STONE, *Primary Examiner.*